F. L. TOOTHAKER.
MOTH NEST PICKER AND RETRIEVER.
APPLICATION FILED APR. 27, 1916.
1,211,506.
Patented Jan. 9, 1917.
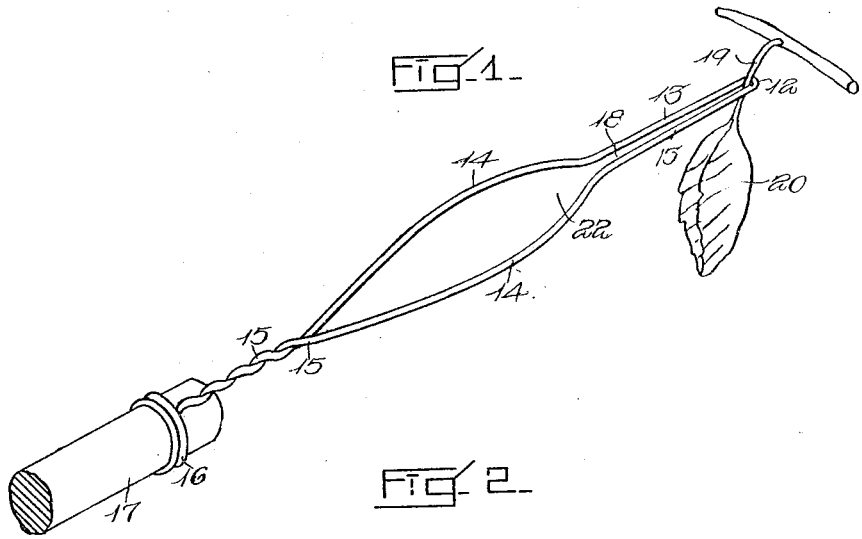
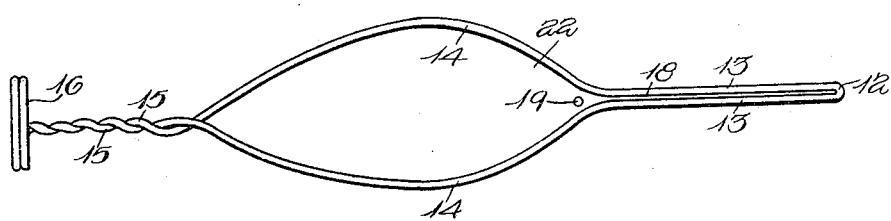
INVENTOR=
F. L. TOOTHAKER
by
ATTORNEYS

UNITED STATES PATENT OFFICE.

FRED L. TOOTHAKER, OF BELFAST, MAINE, ASSIGNOR OF ONE-HALF TO ELON B. GILCHREST, OF BELFAST, MAINE.

MOTH-NEST PICKER AND RETRIEVER.

1,211,506.  Specification of Letters Patent.  Patented Jan. 9, 1917.

Application filed April 27, 1916. Serial No. 93,887.

*To all whom it may concern:*

Be it known that I, FRED L. TOOTHAKER, a citizen of the United States, residing at Belfast, in the county of Waldo and State of Maine, have invented new and useful Improvements in Moth-Nest Pickers and Retrievers, of which the following is a specification.

This invention has for its object to provide an implement for detaching nests of the brown-tail moth from a tree, and controlling or retrieving the detached nests to prevent them from falling on the ground and being lost to sight.

A brown-tail moth nest is composed of a leaf, the edges of which are drawn together while the leaf stem is attached to the tree, and confined by threads spun by the immature caterpillars to form a pouch in which the caterpillars hibernate until the growth of new leaves on which they feed, the threads being extended to reinforce the leaf stem and prevent its accidental detachment from the tree during the winter.

It is customary to pick the nests from the tree and burn them before the caterpillars begin their destructive work in the spring or early summer. The picking means heretofore employed detach the nests and allow them to fall to the ground, where they are liable to remain unnoticed, so that the caterpillars are free to crawl up the tree and become active thereon when the new leaves appear.

My invention is embodied in a picker adapted not only to detach the nests, but also to maintain a tight grip on the detached stems until they are removed by the operator, who is therefore enabled to retrieve and burn all the detached nests.

Of the accompanying drawings forming a part of this specification: Figure 1 represents a perspective view of an implement embodying my invention; Fig. 2 represents a side view of the same as it appears before a stem is gripped; Fig. 3 represents a view similar to a portion of Fig. 2, illustrating the action of the spring-yielding jaws hereinafter described, on a stem.

The same reference characters indicate the same or similar parts in all the views.

My improved implement is made from a length of resilient iron or steel wire, preferably cylindrical and about three-sixteenths of an inch in diameter, although the form and diameter of the wire may be varied. The wire is bent at about its mid-length to form a neck 12, and the two arms connected by said neck are formed into jaw portions 13, curved portions 14, and connected shank members 15, the latter being preferably intertwisted and bent at their extremities to form a socket 16 adapted to receive one end of a pole 17. The jaw portions 13 extend substantially parallel with each other, and are normally separated by a narrow crevice 18, the width of which is less than the thickness of a leaf stem 19 supporting a moth nest 20, said crevice being of uniform width along its major portion, and flaring outwardly at its receiving end. The curved portions 14 bound an opening 22 of suitable size to receive the nest, said opening communicating with the crevice 18.

The jaw portions 13 are elongated, as shown, so that they are adapted to be sprung apart by a stem 19 onto which they are moved endwise from the position shown by Fig. 2 to that shown by Fig. 3.

The jaw portions exert a gradually increasing grip on the stem, the grip being insufficient to cause the detachment of the stem until the latter is relatively near the neck 12, and is therefore so firmly gripped that when the stem is broken it cannot drop from the jaws, and must be removed therefrom by hand, or in other words retrieved by the operator.

The jaws grip the stem 12 without cutting it, and a continued pull on the jaws after they have gripped the stem breaks the stem from the twig or branch on which it grew. The operator is therefore unable to mutilate the tree by cutting off or breaking twigs and branches.

Since the jaws grip and break off the stem without releasing it, no bag or receptacle is required to catch the removed articles. The picker as a whole may therefore be of minimum weight and easily handled, there being no receptacle to increase its weight. Moth nests on shade and forest trees are frequently located much higher than those on fruit trees, so that a picker to be operative at considerable heights must be as light as possible, and its jaws must be so exposed that they are readily visible from below and not concealed from the view of the operator by a receptacle under the jaws.

Having described my invention, I claim:

A moth nest picker and retriever comprising a length of resilient wire bent to form a neck, two substantially parallel portions forming spring-yielding jaws connected by the neck and normally separated by an elongated crevice which is narrower than the thickness of a leaf stem, is of substantially uniform width along its major portion, and flares outwardly at its receiving end, two curved portions bounding a nest-receiving opening communicating with said crevice, and two end members connected to form a pole-engaging shank, said jaws being movable endwise upon an attached nest-supporting leaf stem in said opening, and caused by such movement to exert a gradually increasing grip on the stem which is maintained until the stem and nest are detached and retrieved.

In testimony whereof I have affixed my signature.

FRED L. TOOTHAKER.

Copies of this patent may be obtained for five cents each, by addressing the "Commissioner of Patents. Washington, D. C."